Dec. 26, 1939.  S. S. COLE  2,184,938
PREPARATION OF PIGMENT COMPOSITIONS
Filed Aug. 7, 1937
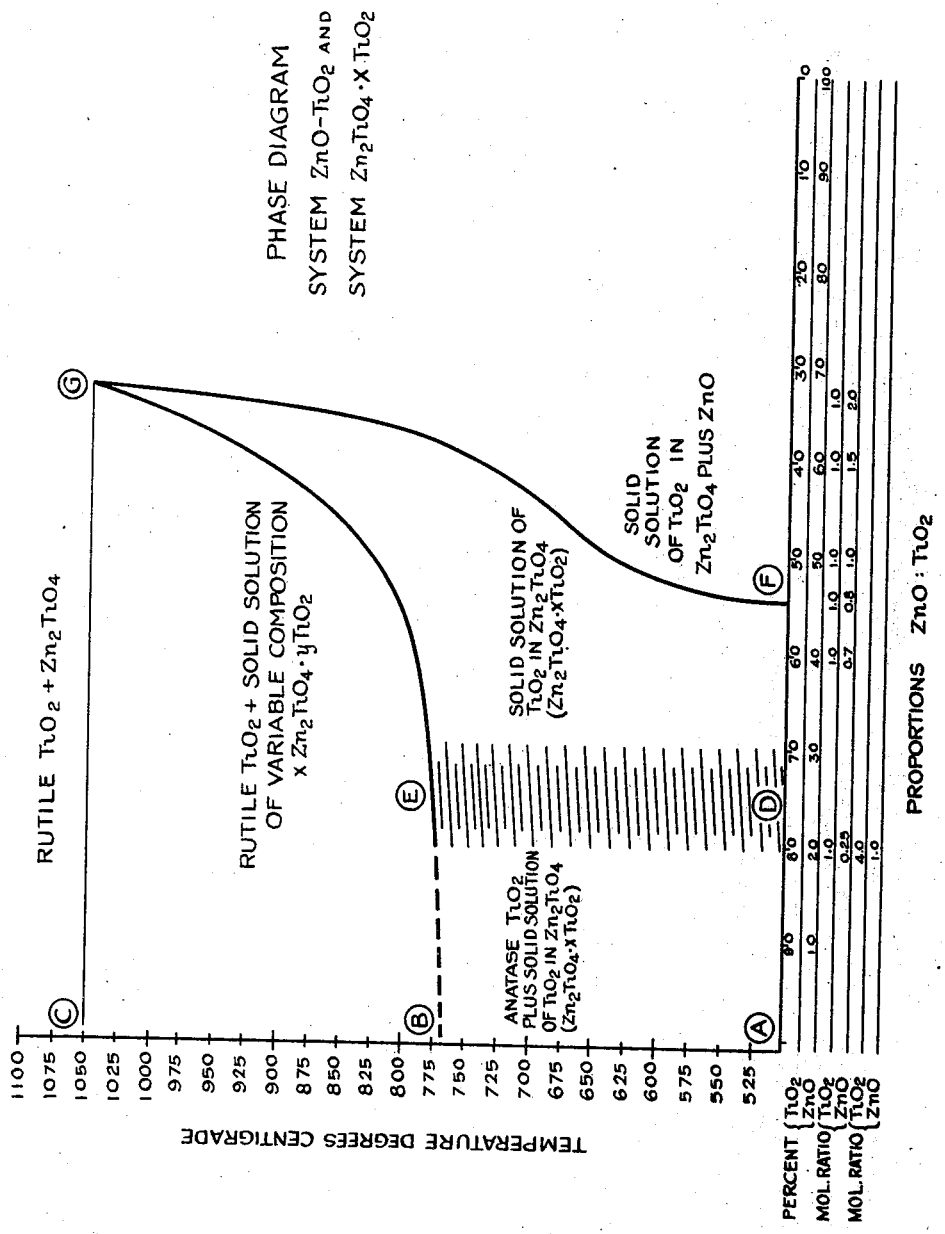
INVENTOR.
SANDFORD S. COLE.
BY
Charles F. Kaegele
ATTORNEY.

Patented Dec. 26, 1939

2,184,938

UNITED STATES PATENT OFFICE 2,184,938

PREPARATION OF PIGMENT COMPOSITIONS

Sandford S. Cole, Metuchen, N. J., assignor to National Lead Company, New York, N. Y., a corporation of New Jersey Application August 7, 1937, Serial No. 157,887

6 Claims. (Cl. 134—58)

This invention relates to pigments which consist of or comprise a solid solution of titanium dioxide in a titanate.

In the copending application, Serial No. 157,888, filed August 17, 1937, in which I am a joint petitioner, there is described a method for the preparation of pigments consisting of or comprising solid solutions of titanium dioxide in zinc orthotitanate and rutile titanium dioxide. It has been shown in the aforementioned application that a solid solution series for the system $ZnO-TiO_2$ exists, and that there is a critical temperature for a solid solution of any given composition above which that solid solution breaks down liberating rutile titanium dioxide and a solid solution poorer in titanium dioxide but stable at the increased temperature. Thus with increasing temperature solid solutions rich in titanium dioxide progressively liberate the titanium oxide until, when the temperature reaches above about 1050° C. only a mixture of zinc orthotitanate and rutile titanium dioxide is obtained. Thus, by control of proportions of titanium dioxide to zinc oxide and of the calcination temperatures a wide range of products which are useful as pigments may be prepared.

The products of the aforementioned copending application are characterized by the presence of rutile titanium dioxide. For certain purposes, however, for instance, the manufacture of coating compositions for the protection of metal surfaces or for use as undercoats upon which is applied a second, or outer coating, it may be desirable to employ zinc titanate pigments in which titanium dioxide is in solid solution in zinc orthotitanate and in which free titanium dioxide is substantially absent.

Both zinc titanate and solid solutions of titanium dioxide in zinc titanate are useful as pigments. The latter, on account of their higher content of titanium dioxide, are superior products possessing greater tinctorial and hiding power. However, as set forth in the above mentioned copending application, such solid solutions are unstable at elevated temperatures and therefore must be prepared under careful control of temperature which at times in commercial preparations may be expensive and impractical.

I have now discovered a method for stabilizing solid solutions of titanium dioxide in zinc orthotitanate against the decomposition occasioned by heating to temperatures above the normal stability point thereof. My novel method consists in heating a mixture of reactive titanium compound, reactive zinc compound containing at least an excess of titanium dioxide over the ratio of 2 mols. zinc oxide to 1.0 mol. titanium dioxide and a predetermined relatively small amount of an inorganic phosphate compound at temperatures at which a solid solution of titanium dioxide in zinc orthotitanate is obtained.

Thus, as will be seen, one of the objects of my invention is a method for obtaining solid solutions of titanium dioxide in zinc orthotitanate which are stable at temperatures above the normal stability point thereof.

The proportion of phosphate compound to be employed need only be very small. It is convenient to calculate the amount on the basis of phosphoric acid anhydride, $P_2O_5$, contained in the phosphate in relation to the titanium dioxide, $TiO_2$, content of the starting mixture. While I have observed a marked stabilizing effect on solid solutions of titanium dioxide in zinc orthotitanate through the use of very small amounts, even as low as 0.05 percent, the best results, i. e., substantially complete stability, is obtained when the starting mixture contains about 0.2 percent $P_2O_5$ based on the weight of titanium dioxide present. Larger quantities can be employed but there is no improvement involved in so doing and it will be understood that in commercial practice the phosphate content should not be so great as to adversely affect the pigment properties, e. g., tinting strength, hiding power, pH value, etc., of the solid solutions. Thus, in preparing pigments according to my invention it is well to keep the phosphate content below about 5.0 percent $P_2O_5$ based on the weight of the titanium dioxide present.

The phosphate content may be added in several ways and a wide variety of phosphate compounds may be employed in the practice of my invention. For example, a phosphoric acid, e. g., $H_3PO_4$, may be added to the starting mixture of reactive titanium compound and reactive zinc compound. On the other hand, many other inorganic compounds may be used such as, the phosphates of the alkali and alkaline-earth metals, titanium phosphates, etc.

As a starting ingredient I may avail myself of a reactive titanium compound which contains all, or a part, of the desired phosphate content. Reactive titanium compounds containing phosphates may be obtained in several ways. For instance, titanium dioxide may be prepared as described in United States Patent No. 1,412,027, wherein phosphoric acid or suitable phosphate are added to hydrous titanium oxide prior to calcination. The operability of my invention is not affected by the manner of incorporation in the mixture of reactive titanium compound and reactive zinc compound. It may be present in the reactive titanium compound prepared in any known way or it may be present in the zinc compound. On the other hand, it may be added to the mixture of reactive titanium and zinc compounds prior to heating.

By the term "reactive titanium compound" as used by me in this description and in the claims attached hereto, I mean to include titanium oxides and the compounds of titanium which on heating to the temperatures necessary to form the solid solutions of titanium dioxide in zinc orthotitanate liberate titanium oxide, such as titanyl sulfate, basic titanium sulfate, etc.; it being understood that by "titanium oxides" I mean hydrolytically precipitated hydrous titanium oxide as well as titanium dioxide.

As shown in the above mentioned copending application Serial No. 157,888, a solid solution of titanium dioxide in zinc orthotitanate may result from the thermal combination of a reactive titanium compound on the one hand, and either zinc oxide or a zinc compound which will yield the oxide on heating, zinc orthotitanate or a solid solution of titanium dioxide in zinc orthotitanate containing titanium dioxide below the saturation point. Therefore, by the term "reactive zinc compound" as used herein I mean to include zinc oxide, compounds of zinc which on heating yield the oxide, zinc orthotitanate, and solid solutions of titanium dioxide in zinc orthotitanate which may take up in solution additional titanium dioxide.

Solid solution formation, I have found, apparently follows closely after the initial chemical combination of reactive titanium compound with reactive zinc compound. The initial reaction temperature between zinc oxide and titanium dioxide I have determined to be about 450° C. The solid solution formation progresses more rapidly as the temperature approaches the decomposition point of the solid solution which, as shown in the single figure, varies according to the composition of the solid solution. It will be seen, therefore, that the temperatures employed will be above about 450° C., preferably, for commercial purposes, between about 650° C. and about 950° C. Temperatures above about 1100° C. are not desirable since at such temperatures, the reaction mixtures tend to fuse.

As indicative of the temperature at which solid solutions of the system $ZnO-TiO_2$ decompose, I have attached hereto a phase diagram. The ordinates of this diagram represent temperature in degrees centigrade while the abscissa represents the composition of solid solutions of the system $ZnO-TiO_2$. It will be observed that as the proportion of titanium dioxide in solid solution decreases, approaching the compound zinc orthotitanate the solid solutions become more stable. It will also be seen that in order to obtain a solid solution in which free titanium dioxide is substantially absent, a strict control of the temperature of the thermal combination must be maintained.

One advantage of my invention is at once obvious, namely: the necessity for exercising the careful control of temperature of the thermal combination is eliminated and any suitable temperature which rapidly brings about solid solution formation without detriment to the pigmentary properties thereof may be employed. Another advantage is that in most cases an improved whiteness and brightness is imparted to the pigments prepared in accordance with my invention as compared to similar products prepared in other known ways.

The following examples are given for clearness of understanding but in no way to limit my invention:

*Example No. 1*

A mixture of anatase titanium dioxide, zinc oxide and phosphate was prepared in the following proportions:

| | |
|---|---|
| ZnO | 81 |
| $TiO_2$ | 80 |
| $P_2O_5$ (as $H_3PO_4$) | 0.40 |

The mixture was calcined at 700° C. for 8 hours and subsequently calcined at 900° C. for an additional five hours. X-ray diffraction patterns showed no change in the product after the second calcination with respect to unit cell size and did not show any rutile formed. It may be noted that a solid solution of titanium dioxide in zinc orthotitanate normally dissociates at 900° C. into rutile titanium dioxide and a solid solution of the composition $Zn_2TiO_4 \cdot 0.4TiO_2$ as indicated in the copending application Serial No. 157,888.

*Example No. 2*

A mixture of anatase titanium dioxide, a solid solution of titanium dioxide in zinc orthotitanate prepared by calcination at 700° C. for five hours of equimolar quantities of zinc oxide and titanium dioxide, and phosphate as phosphoric acid was made in the following proportions:

| | |
|---|---|
| $TiO_2$ | 100 |
| $Zn_2TiO_4 \cdot TiO_2$ | 2 |
| $P_2O_5$ | 0.2 |

The subsequent calcination at 900° C. for three hours showed only anatase titanium dioxide and a solid solution mixture. When the phosphate was omitted the resulting product at 825° C. was rutile titanium dioxide and a solid solution mixture.

*Example No. 3*

A product was made in accordance with Example No. 1 but the phosphate was introduced as potassium phosphate. The mixture used was:

| | |
|---|---|
| ZnO | 81 |
| $TiO_2$ | 80 |
| $K_3PO_4$ | 1.0 |

The calcination of this mixture at 900° C. for three hours yielded a solid solution with no rutile titanium dioxide.

*Example No. 4*

A product was made by mixing anatase titanium dioxide, zinc oxide and magnesium hypophosphate in the following proportions:

| | |
|---|---|
| $TiO_2$ | 80 |
| ZnO | 81 |
| $Mg(H_2PO_2)_2 \cdot 6H_2O$ | 1.31 |

Subsequent calcination at 900° C. for three hours yielded a solid solution with no rutile titanium dioxide.

*Example No. 5*

Hydrous titanium dioxide containing about 0.2 percent $P_2O_5$ was prepared in the known manner from ilmenite ore. After washing, hydrous titanium oxide was mixed with zinc oxide in the proportions of Example No. 1, omitting the addition of phosphoric acid. Under similar calcining conditions, namely, five hours at 700° C. followed by five hours at 900° C. a like result, i. e., no separation of rutile titanium dioxide but formation of a stable solid solution was obtained.

Pigment products prepared in the manner above described and which consist of solid solutions of titanium dioxide in zinc orthotitanate possess the crystalline structure of spinel. They are exceedingly well adapted for many industrial uses. When incorporated in the usual film-forming vehicles, surface coating compositions are obtained which are extremely useful as protective, and rust-inhibiting coatings for metal surface and, in general, as coatings for other materials. On the other hand, they may be used in the delustering of artificial silk, in the manufacture of paper, rubber, plastics, etc., in fact in every place where a high-grade pigment is required.

The foregoing description of my invention is given for clearness of understanding and no undue limitations should be deduced therefrom, but the appended claims should be read as broadly as possible in the light of the prior art.

I claim:

1. Method of preparing thermally stable solid solutions of titanium dioxide in zinc orthotitanate, which comprises heating a mixture of a zinc compound selected from the group consisting of zinc oxide, compounds of zinc which yield zinc oxide on heating, zinc orthotitanate, and solid solutions of titanium dioxide in zinc orthotitanate which are unsaturated with respect to titanium dioxide, a titanium compound selected from the group consisting of titanium dioxide, hydrous titanium oxide, and titanium compounds which yield titanium dioxide on heating in such proportions that for every mol of $TiO_2$ in said mixture there will be present less than 2 mols ZnO and an amount of an inorganic phosphate compound calculated as $P_2O_5$ between about 0.05 percent and 5.0 percent based on the $TiO_2$ content of the mixture, at temperatures between about 450° C. and 1100° C. until a solid solution of titanium dioxide in zinc orthotitanate is formed.

2. Method according to claim 1 wherein the inorganic phosphate compound is titanium phosphate.

3. Method according to claim 1 wherein the inorganic phosphate compound is phosphoric acid.

4. Method according to claim 1 in which the inorganic phosphate is selected from the group consisting of phosphate of alkali and alkaline earth metals.

5. Method according to claim 1 in which the inorganic phosphate is potassium phosphate.

6. Method of preparing thermally stable solid solutions of titanium dioxide in zinc orthotitanate which comprises heating a mixture of zinc oxide and a sufficient amount of a titanium oxide to furnish between about 0.5 mol. and about 4.0 mols $TiO_2$ for every mol ZnO and an amount of an inorganic phosphate compound calculated as $P_2O_5$ between about 0.05 percent and 5.0 percent based on the $TiO_2$ content of the mixture at temperatures between about 650° C. and 950° C. until a solid solution of titanium dioxide in zinc orthotitanate is formed.

SANDFORD S. COLE.